US010735526B2

(12) United States Patent
Ishikawa et al.

(10) Patent No.: US 10,735,526 B2
(45) Date of Patent: Aug. 4, 2020

(54) COMMUNICATION APPARATUS, COMMUNICATION CONTROL METHOD, AND NON-TRANSITORY COMPUTER-READABLE RECORDING MEDIUM FOR CONTROLLING DATA COMMUNICATION OF AN APPLICATION

(71) Applicant: KYOCERA Corporation, Kyoto (JP)

(72) Inventors: Shuji Ishikawa, Yokohama (JP); Yasuhiro Ito, Tokyo (JP); Tomoya Kamijo, Yokohama (JP); Hidetaka Hayashi, Yokohama (JP); Kohei Michigami, Yokohama (JP); Kazuo Onishi, Yokohama (JP); Kazuya Chito, Machida (JP)

(73) Assignee: KYOCERA Corporation, Kyoto (JP)

( * ) Notice: Subject to any disclaimer, the term of this patent is extended or adjusted under 35 U.S.C. 154(b) by 40 days.

(21) Appl. No.: 15/423,654

(22) Filed: Feb. 3, 2017

(65) Prior Publication Data

US 2017/0230465 A1 Aug. 10, 2017

(30) Foreign Application Priority Data

Feb. 4, 2016 (JP) .................................. 2016-019811

(51) Int. Cl.
*G06F 15/173* (2006.01)
*H04L 29/08* (2006.01)
(Continued)

(52) U.S. Cl.
CPC ........ *H04L 67/145* (2013.01); *H04L 12/4679* (2013.01); *H04L 47/12* (2013.01); *H04L 47/803* (2013.01); *H04L 67/125* (2013.01)

(58) Field of Classification Search
CPC . H04L 67/145; H04L 67/125; H04L 12/4679; H04L 47/12; H04L 47/803; H04L 65/1069; H04W 48/06; H04W 48/14; H04W 52/0209; H04W 52/0264; H04W 76/27; H04W 88/02; H04M 1/72577; H04M 1/72597
(Continued)

(56) References Cited

U.S. PATENT DOCUMENTS 8,769,643 B1 * 7/2014 Ben Ayed ............... G06F 21/43
726/5
2011/0252430 A1 * 10/2011 Chapman ................ G06F 9/485
718/107
(Continued)

FOREIGN PATENT DOCUMENTS

JP 2015-162701 A 9/2015

*Primary Examiner* — Dustin Nguyen
*Assistant Examiner* — Hao H Nguyen
(74) *Attorney, Agent, or Firm* — Studebaker & Brackett PC

(57) ABSTRACT

A communication apparatus capable of data communication includes a controller that temporarily permits data communication of an application. Upon the application transitioning to the background, the controller maintains temporary permission for data communication of the application when the application transitioned to the background as a result of an interrupt not intended by a user, and prohibits data communication of the application when the application transitioned to the background as a result of an interrupt other than an interrupt not intended by the user.

6 Claims, 10 Drawing Sheets

(51) Int. Cl.
*H04L 12/46* (2006.01)
*H04L 12/801* (2013.01)
*H04L 12/927* (2013.01)

(58) Field of Classification Search
USPC ........ 709/204, 206, 207, 223, 225; 715/200, 715/201, 700, 764, 810; 455/151.1, 405, 455/414.1, 415, 418
See application file for complete search history.

(56) References Cited

U.S. PATENT DOCUMENTS

| | | | | |
|---|---|---|---|---|
| 2013/0024812 | A1* | 1/2013 | Reeves | G06F 3/1423 715/810 |
| 2014/0106720 | A1* | 4/2014 | Mairs | H04M 3/42102 455/415 |
| 2014/0143568 | A1* | 5/2014 | Kim | G06F 1/3206 713/323 |
| 2014/0235228 | A1* | 8/2014 | Hirako | H04M 1/72577 455/418 |
| 2015/0180746 | A1* | 6/2015 | Day, II | H04W 4/029 455/405 |
| 2015/0205894 | A1* | 7/2015 | Faris | G06Q 30/0255 703/21 |
| 2015/0264292 | A1* | 9/2015 | Greene | H04N 5/76 386/248 |
| 2015/0334219 | A1* | 11/2015 | Soundararajan | H04M 1/67 455/414.1 |
| 2015/0373023 | A1* | 12/2015 | Walker | H04L 63/20 726/3 |
| 2016/0098616 | A1* | 4/2016 | Miller | H04L 51/32 709/204 |
| 2016/0157239 | A1* | 6/2016 | Kalderen | H04W 28/0289 370/329 |
| 2017/0195250 | A1* | 7/2017 | Siddhartha | H04L 47/803 |
| 2018/0004471 | A1* | 1/2018 | Suzuki | G06F 3/1296 |
| 2018/0191909 | A1* | 7/2018 | Mattes | H04L 65/1053 |
| 2018/0192237 | A1* | 7/2018 | Privitera | H04W 4/021 |
| 2019/0205939 | A1* | 7/2019 | Lal | H04L 67/18 |

* cited by examiner

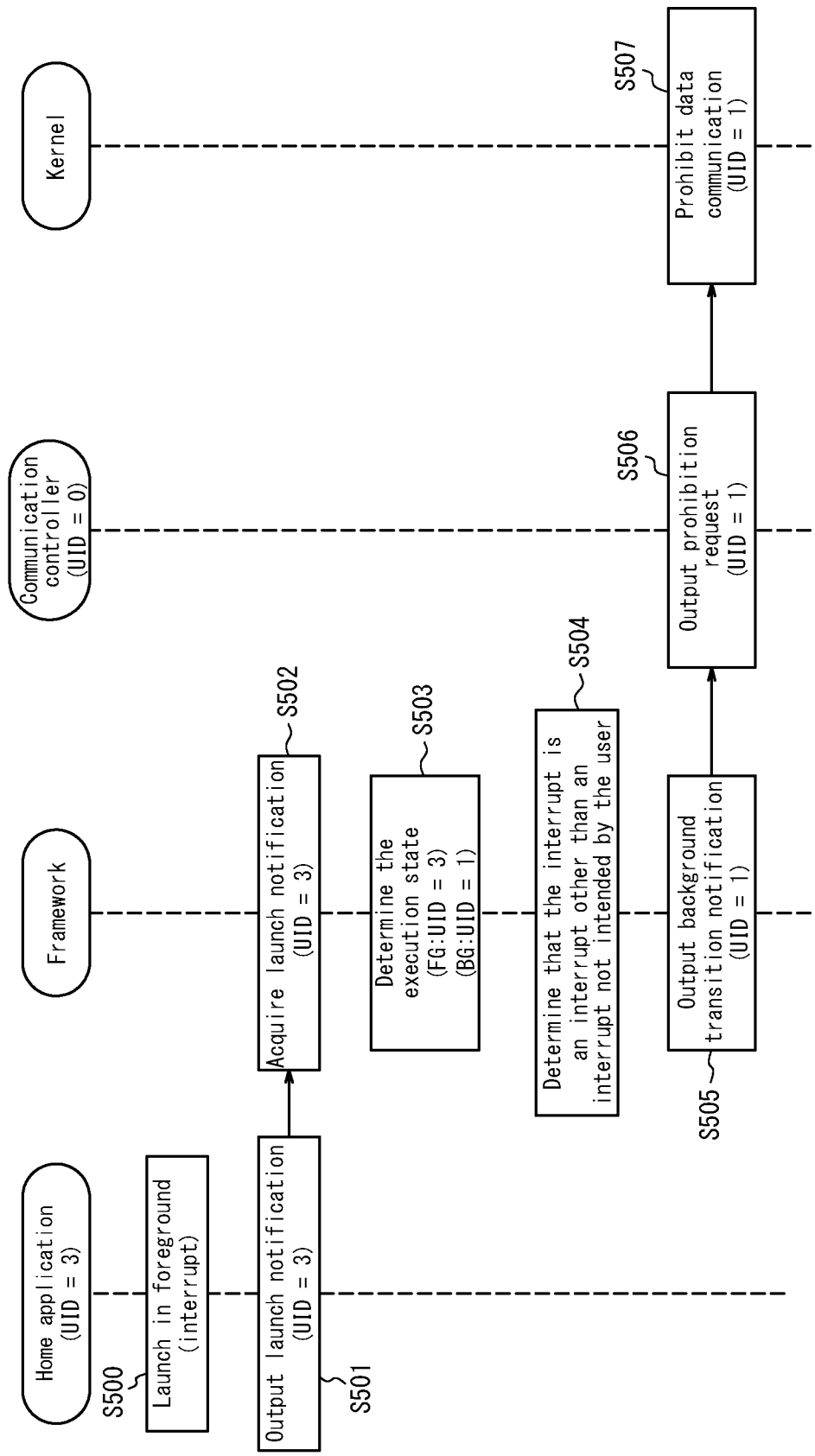

COMMUNICATION APPARATUS, COMMUNICATION CONTROL METHOD, AND NON-TRANSITORY COMPUTER-READABLE RECORDING MEDIUM FOR CONTROLLING DATA COMMUNICATION OF AN APPLICATION

CROSS-REFERENCE TO RELATED APPLICATIONS

This application claims priority to and the benefit of Japanese Patent Application No. 2016-019811 filed on Feb. 4, 2016, the entire contents of which are incorporated herein by reference.

TECHNICAL FIELD

This disclosure relates to a communication apparatus, a communication control method, and a non-transitory computer-readable recording medium.

BACKGROUND

Communication apparatuses such as mobile terminals that can perform data communication have been proposed (for example, see JP 2015-162701 A (PTL 1)).

SUMMARY

A communication apparatus according to one of the embodiments of this disclosure is capable of data communication and includes:
a controller configured to temporarily permit data communication of an application; such that
upon the application transitioning to the background, the controller
maintains temporary permission for data communication of the application when the application transitioned to the background as a result of an interrupt not intended by a user; and
prohibits data communication of the application when the application transitioned to the background as a result of an interrupt other than an interrupt not intended by the user.

A communication control method according to one of the embodiments of this disclosure is performed by a communication apparatus capable of data communication, the communication control method including:
temporarily permitting data communication of an application; and
upon the application transitioning to the background,
maintaining temporary permission for data communication of the application when the application transitioned to the background as a result of an interrupt not intended by a user; and
prohibiting data communication of the application when the application transitioned to the background as a result of an interrupt other than an interrupt not intended by the user.

A non-transitory computer-readable recording medium according to one of the embodiments of this disclosure includes computer program instructions, which when executed by a communication apparatus capable of data communication, cause the communication apparatus to:
temporarily permit data communication of an application; and
upon the application transitioning to the background, maintain temporary permission for data communication of the application when the application transitioned to the background as a result of an interrupt not intended by a user; and
prohibit data communication of the application when the application transitioned to the background as a result of an interrupt other than an interrupt not intended by the user.

BRIEF DESCRIPTION OF THE DRAWINGS

In the accompanying drawings:

FIG. 10 illustrates the sequence of processing in response to a second interrupt according to Embodiment 2.

DETAILED DESCRIPTION

Many communication apparatuses are configured so that while data communication by applications running on the communication apparatus is permitted by default, data communication by applications selected by the user can be prohibited. In this case, for applications of which the user is aware, the user can control data communication by the applications. The user might not, however, be fully aware of what sort of applications are running on the communication apparatus. In particular, the user is highly likely not to be aware of applications running in the background of the system of the communication apparatus. Accordingly, in a case where the user would choose to prohibit data communication if aware of operations by an application, the user might not choose to prohibit data communication of the application due to not being aware of the operations. Regarding data communication performed by the system of a communication apparatus, it may also be the case that the user is given no choice as per the system specifications of the communication apparatus. In these cases, data communication not intended by the user may be performed, causing the amount of data communicated to increase without the user intending it to.

Therefore, it would be helpful to provide a communication apparatus, a communication control method, and a non-transitory computer-readable recording medium that can reduce the occurrence of communication not intended by the user.

The communication apparatus, communication control method, and non-transitory computer-readable recording medium according to embodiments of this disclosure can reduce the occurrence of communication not intended by the user.

Embodiment 1

The following describes a communication apparatus according to one of the embodiments in detail with reference to the drawings. The communication apparatus according to this embodiment may be a mobile device, such as a mobile phone or a smartphone. The communication apparatus according to this embodiment, however, is not limited to being a mobile device and may be any of a variety of electronic devices that perform data communication, such as a desktop PC, a notebook PC, a tablet PC, a household appliance, an industrial device (FA device), a dedicated terminal, or the like.

[Apparatus Structure]

Figure 1:
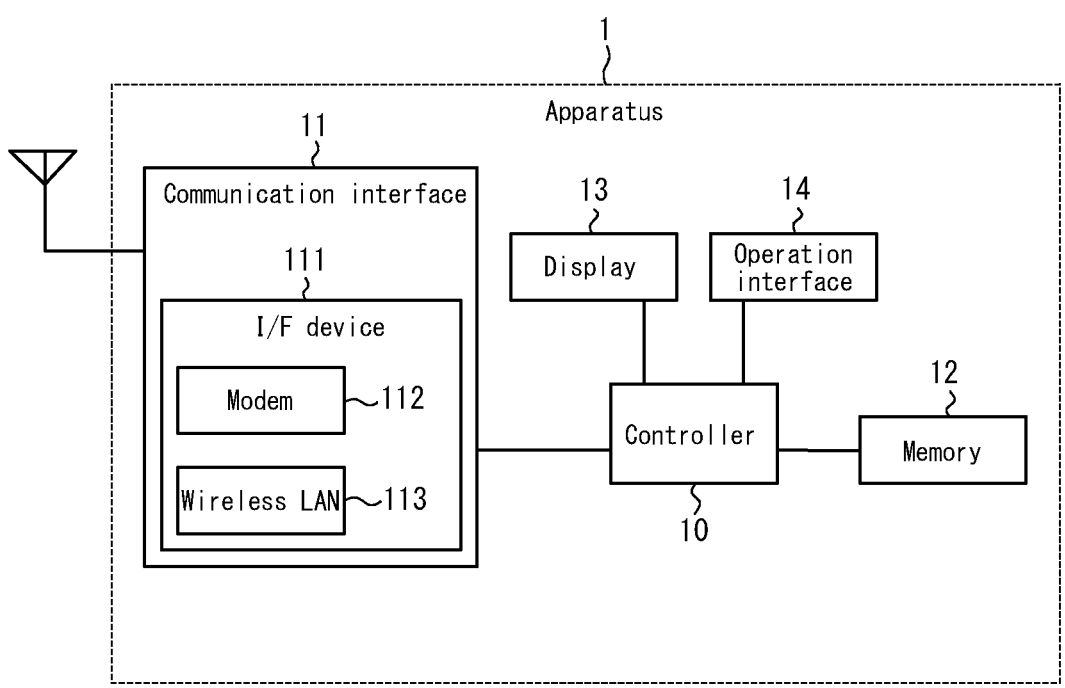
FIG. 1 is a functional block diagram schematically illustrating an example of the structure of a communication apparatus according to Embodiment 1.

FIG. 1 is a functional block diagram schematically illustrating an example of the structure of a communication apparatus 1 according to this embodiment. As illustrated in FIG. 1, the communication apparatus 1 includes a controller 10, a communication interface 11, a memory 12, a display 13, and an operation interface 14. The controller 10 is connected to and controls the communication interface 11, memory 12, display 13, and operation interface 14.

The controller 10 may be configured by a processor, microcomputer, or the like that can execute an operating system (OS) and application software (app or application). The OS may, for example, be Android® (Android is a registered trademark in Japan, other countries, or both). The app is described below.

The communication interface 11 is a communication interface that performs cellular communication, wireless LAN communication, or the like and is provided with an interface (I/F) device 111. The I/F device 111 includes a modem 112 and a wireless LAN device 113. The communication interface 11 is connected to a network such as the Internet using the I/F device 111 and performs data communication with the network. As a result, the communication apparatus 1 can perform data communication with the network. The communication interface 11 is connected to the controller 10 and acquires data to be output to the network from the controller 10. The controller 10 selects data to output to the communication interface 11 based on filtering. The filtering is described below. The controller 10 also acquires data received from the network from the communication interface 11.

When connecting to the network with a cellular communication method, a pay-as-you-go fee structure is typically adopted, with the communication fee increasing as the amount of transmitted data (packets) increases. On the other hand, when connecting to the network with a method such as wireless LAN communication, such a fee structure is not typical.

The memory 12 may, for example, be configured by a semiconductor memory. A variety of information and data, along with programs for the OS, apps, and the like executed by the controller 10, are stored in the memory 12. The controller 10 executes programs stored in the memory 12. The controller 10 stores data generated by executing the programs in the memory 12. The memory 12 may also function as a working memory.

The display 13 displays characters, images, objects for operation, pointers, and the like based on information acquired from the controller 10. The display 13 may, for example, be a display device such as a liquid crystal display, an organic EL display, an inorganic EL display, or the like, but is not limited to these examples.

The operation interface 14 may be configured by physical keys such as numeric keys, a touchpad, a touch panel, or the like. In accordance with the content of input acquired from the operation interface 14, the controller 10 performs actions such as moving the pointer or the like displayed on the display 13 and selecting an object for operation.

Figure 2:
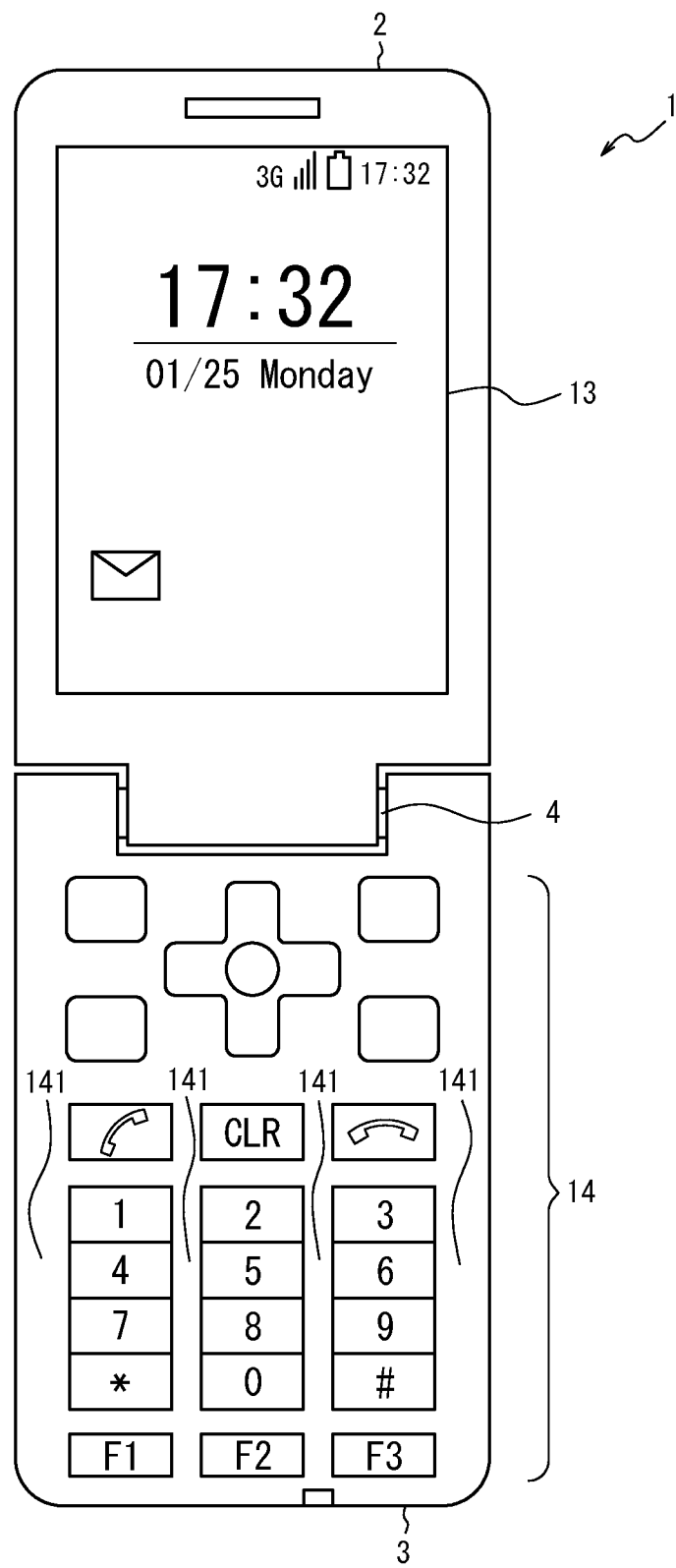
FIG. 2 is an external view of an example of the communication apparatus according to Embodiment 1.

FIG. 2 is an external view of an example of the communication apparatus 1 according to this embodiment. As illustrated in FIG. 2, the communication apparatus 1 according to this embodiment is a folding feature phone (flip phone, clamshell phone, or the like). In the communication apparatus 1, an upper housing 2 and a lower housing 3 are connected by a hinge 4 so as to be rotatable. The upper housing 2 is provided with the display 13, and the lower housing 3 is provided with the operation interface 14. The operation interface 14 is provided with physical keys, such as numeric keys, and with a touchpad 141 at a location where no physical key is provided. The communication apparatus 1 for example receives a selection operation on an object for operation using a physical key or receives a movement operation of a pointer or the like using the touchpad 141.

[Apps]

Apps are installed on the communication apparatus 1 and stored in the memory 12 so as to be executable by the controller 10. When the apps are installed on the communication apparatus 1, a unique user identifier (UID) is allocated to each app. Each app is executed by the controller 10 as a process associated with a UID on the OS.

When executed by the controller 10, an app accesses resources such as the file system. If each app were to access resources without restriction, the resource areas used by the apps would overlap, which might prevent the apps from executing properly. Therefore, access to resources is restricted by the UIDs associated with processes running on the OS, so that apps do not affect each other with their use of resources. In other words, the resources that can be accessed by each process are restricted to resources of the process associated with the same UID.

Each app may further be allocated a group identifier (GID or group ID). The GID identifies the group to which the unique UID allocated to each app belongs. One UID alone may belong to one group, or a plurality of UIDs may belong to one group. When an app is executed as a process associated with a UID, the process may also be associated with a GID. The restricted resources that can be accessed by each process may be broadened to include not only resources of the process associated with the same UID, but also resources of processes associated with the same GID.

Apps are executed in the foreground (FG) or the background (BG). A state in which an app is executed in the foreground is, for example, a state in which the execution status is displayed on the display 13 to allow user confirmation, or a state in which the user can perform operations with the operation interface 14. A state in which an app is executed in the background is, for example, a state in which the execution status is not displayed on the display 13 and the user cannot perform operations, or a state in which the app is running without intent by the user.

[Control of Data Communication]

The apps executed by the controller 10 perform data communication with a network, such as the Internet, using the communication interface 11. As described above, the apps are each executed as a process associated with a UID on the OS. The UID is associated with the data transmitted by the app. By determining whether to permit or prohibit (restrict) transmission of data based on the UID associated with the data, the controller 10 can control whether to permit or prohibit data communication for the data transmitted by each app. As a general rule, in the following explanation of this embodiment, data communication refers to data communication between the communication interface 11 and the network.

Figure 3:
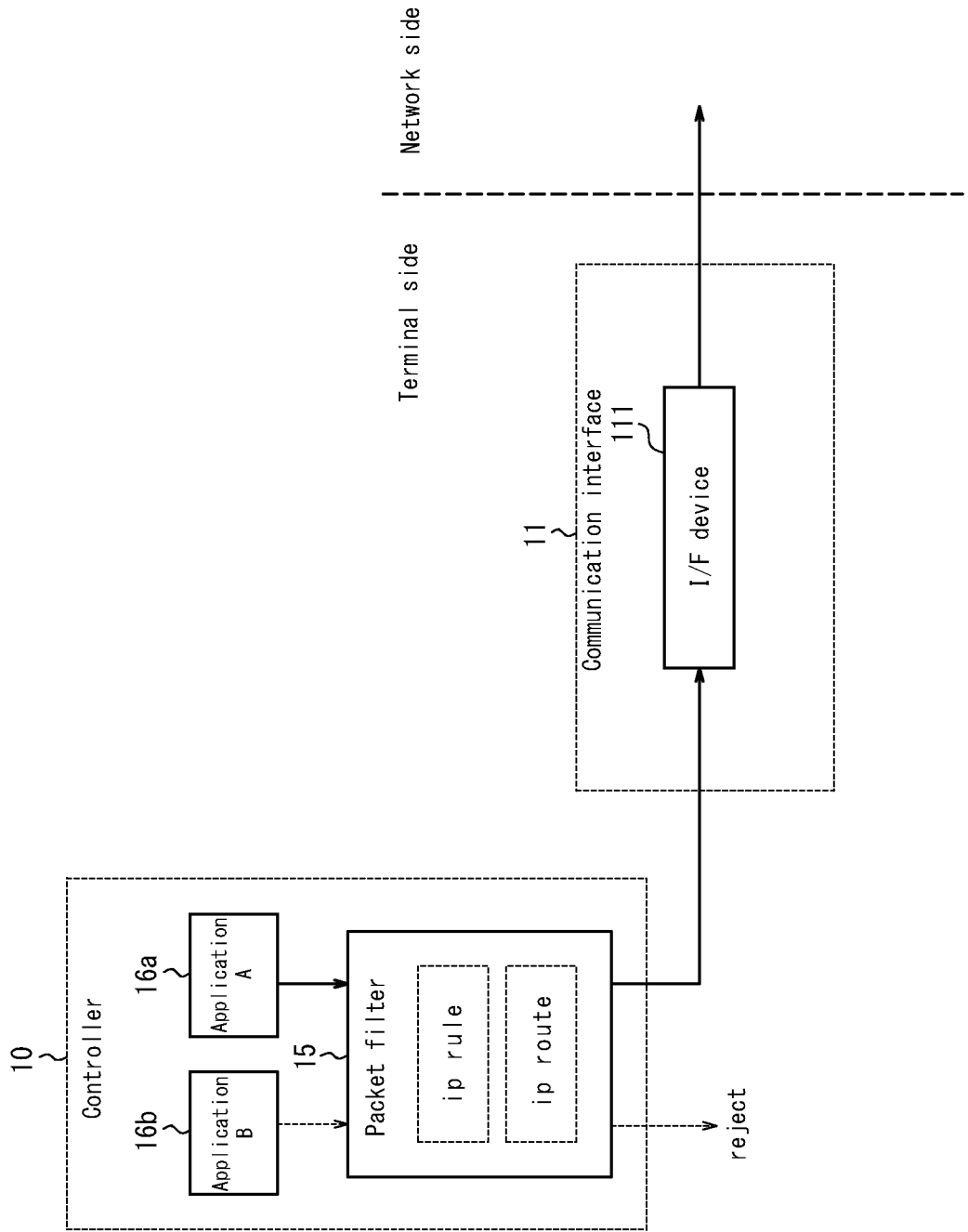
FIG. 3 is a block diagram illustrating an example of the flow of data according to Embodiment 1.

FIG. 3 is a block diagram illustrating an example of the flow of data according to this embodiment. In FIG. 3, the controller 10 and the communication interface 11 are provided on the terminal side. The communication interface 11 is connected to the network and performs data communication with the network.

In FIG. 3, the controller 10 executes an app A16a and an app B16b as processes on the OS. The apps executed by the controller 10 request data communication with the network as necessary. For example, the app A16a requests data transmission to the network. In this case, the data to transmit from the app A16a to the network are input into a packet filter 15 operating in the controller 10. Similarly, data to transmit from the app B16b to the network are input into the packet filter 15 from the app B16b.

The packet filter 15 filters data from the controller 10 to the network. The filtering is processing to determine whether to permit or prohibit transmission of data requested by an app based on set filtering conditions. The filtering conditions for example include an ip_rule or an ip_route. These filtering conditions are stored in the memory 12 and referred to by the packet filter 15. Hereinafter, operations to set the filtering conditions are assumed to include operations to store the filtering conditions in the memory 12. The filtering conditions may be held in the controller 10 without being stored in the memory 12.

The ip_rule for example includes a condition for determining whether to transmit data whose source is X to the network. The ip_route for example includes a condition for determining the route (relay router or the like) for transmitting data for which the destination is designated as Y to the network.

In FIG. 3, the flow of data transmitted from the app A16a is indicated by a solid arrow, whereas the flow of data transmitted from the app B16b is indicated by a dashed arrow. Of these two, the data transmitted from the app A16a are transmitted to the communication interface 11 without transmission being prohibited by the filtering in the packet filter 15. On the other hand, the data transmitted from the app B16b are prohibited by the filtering in the packet filter 15 and are not transmitted to the communication interface 11. This operation is indicated by the dashed arrow in FIG. 3 pointing towards the word "reject".

The data that pass through the packet filter 15 (in the case of FIG. 3, the data transmitted from the app A16a as indicated by the solid arrow) are input into the communication interface 11. The communication interface 11 transmits the data to the network using the I/F device 111. When transmitting the data to the network, the communication interface 11 may use cellular communication by the modem 112, wireless LAN communication by the wireless LAN device 113, or another communication method.

[Filtering]

It is determined whether to permit or prohibit data communication for data transmitted from an app based on the UID allocated to the app that is the source of data transmission. Hereinafter, data that are transmitted from an app to which X is allocated as the UID (app with a UID of X) are also referred to as data with a UID of X. The filtering condition used to filter data with a UID of X is also referred to as the filtering condition for data with a UID of X.

The packet filter 15 for example has a filtering condition that only allows data communication for data transmitted from an app with a UID of 1. The filtering condition may also be a combination of a plurality of conditions.

The following describes the sequence for data communication when filtering according to this embodiment is performed. The filtering according to this embodiment is assumed to determine whether to permit or prohibit data communication for data transmitted by an app running in the background. The following description of filtering according to this embodiment is based on this assumption.

The filtering according to this embodiment has a set filtering condition such that data communication is prohibited by default (default condition to prohibit communication). By the default condition to prohibit communication being set, all data communication is prohibited unless another filtering condition is further set. The default condition to prohibit communication may be set when the communication apparatus 1 is shipped or when the communication apparatus 1 is initialized. In other words, in this embodiment, the "default" refers to the standard operation that is set in advance at a predetermined time (for example, when the communication apparatus 1 is shipped, when the communication apparatus 1 is initialized, or the like).

In the filtering conditions used in this embodiment, in order to perform necessary data communication, a condition to permit data communication (condition to permit communication) is set in addition to the default condition to prohibit communication. In this case, the condition to permit communication takes priority over the default condition to prohibit communication.

Figure 4:
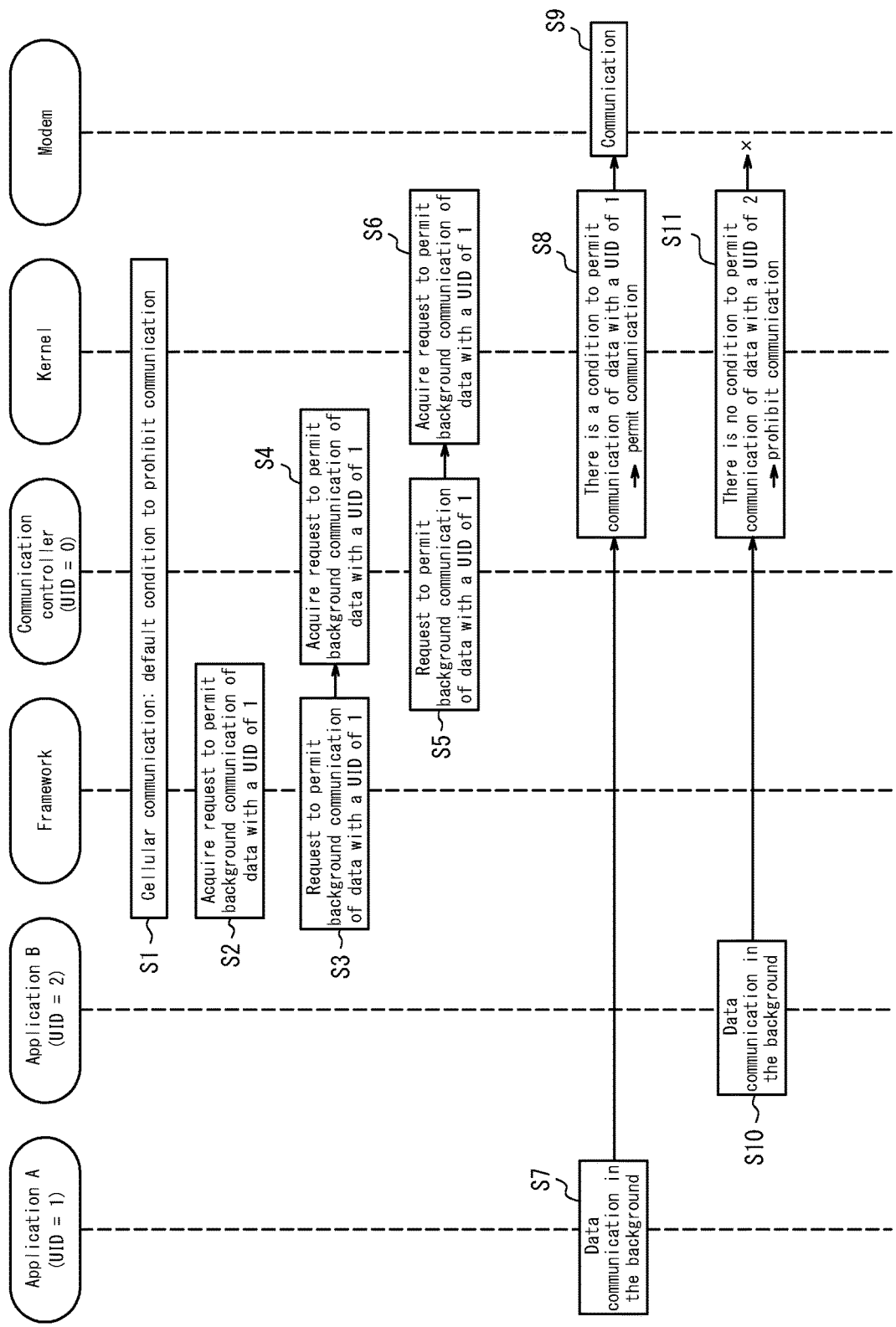
FIG. 4 illustrates the sequence of filtering according to Embodiment 1.

FIG. 4 illustrates the sequence of filtering according to this embodiment. FIG. 4 illustrates the sequence for the app A16a, app B16b, framework, communication controller, kernel, and modem 112.

As described above, the modem 112 is hardware that functions as a communication interface to perform cellular communication. In FIG. 4, data communication by cellular communication using the modem 112 is described, but the modem 112 may be replaced by another I/F device 111, such as the wireless LAN device 113, and data communication may be performed by another communication method.

The kernel, communication controller, and framework are software executed by the controller 10. The kernel, communication controller, and framework are included in the OS of the communication apparatus 1. In FIG. 4, the communication controller is allocated a UID of 0.

The framework is software that includes a functional group for causing apps to operate on the OS. In general, by combining portions of the functional group prepared on the framework, the functions of each app can be implemented.

The kernel is software that forms the nucleus of the OS. Based on processing of the apps and other software, the kernel manages processing on the communication interface 11 and other hardware to allow use of the hardware functions.

The communication controller is a daemon program that executes network related processing and executes processing that connects the framework and the kernel. In particular, the communication controller processes data to allow the kernel to use the functions of the communication interface 11. In this embodiment, the communication controller outputs, to the kernel, conditions for the kernel to determine whether to permit or prohibit data output to the communication interface 11.

In this embodiment, the filtering is described as being performed by the packet filter 15. The packet filter 15 is a virtual processing unit, and the actual filtering is performed by the communication controller and the kernel.

The app A16*a* and the app B16*b* are processes running on the OS. In FIG. 4, a UID of 1 is allocated to the app A16*a*, and a UID of 2 is allocated to the app B16*b*.

The following describes the sequence illustrated in FIG. 4. In the case of data transmission by an app running in the background, data communication by cellular communication is prohibited by default (step S1). In other words, as a filtering condition, a default condition to prohibit communication is set for data transmitted from an app running in the background. In FIG. 4, the kernel, communication controller, and framework recognize that the default condition to prohibit communication is set. In particular, when the kernel recognizes that the default condition to prohibit communication is set, data are not transmitted to the modem 112.

Next, the framework acquires a request to permit data communication for data with a UID of 1 in the case of an app running in the background (request to permit communication of data with a UID of 1) (step S2). The framework then outputs the request to permit communication of data with a UID of 1 to the communication controller (step S3).

The communication controller acquires the request to permit communication of data with a UID of 1 (step S4). Next, the communication controller outputs the request to permit communication of data with a UID of 1 to the kernel (step S5).

The kernel acquires the request to permit communication of data with a UID of 1 (step S6). With the above operations in steps S3 to S6, the request to permit communication of data with a UID of 1 is conveyed to the kernel. In other words, as a filtering condition, a condition to permit communication for data with a UID of 1 is set.

Next, when the app A16*a* issues a request for data communication while running in the background (step S7), the kernel permits the data communication, since the kernel recognizes that the condition to permit communication for data with a UID of 1 is set (step S8). The modem 112 then performs data communication to transmit the data with a UID of 1 to the network (step S9).

Conversely, when the app B16*b* allocated a UID of 2 requests data communication while running in the background (step S10), the kernel recognizes that a condition to permit communication for data with a UID of 2 is not set. Therefore, the kernel prohibits data communication based on the default condition to prohibit communication (step S11).

<Sequence of Data Transmission from an App>

Figure 5:
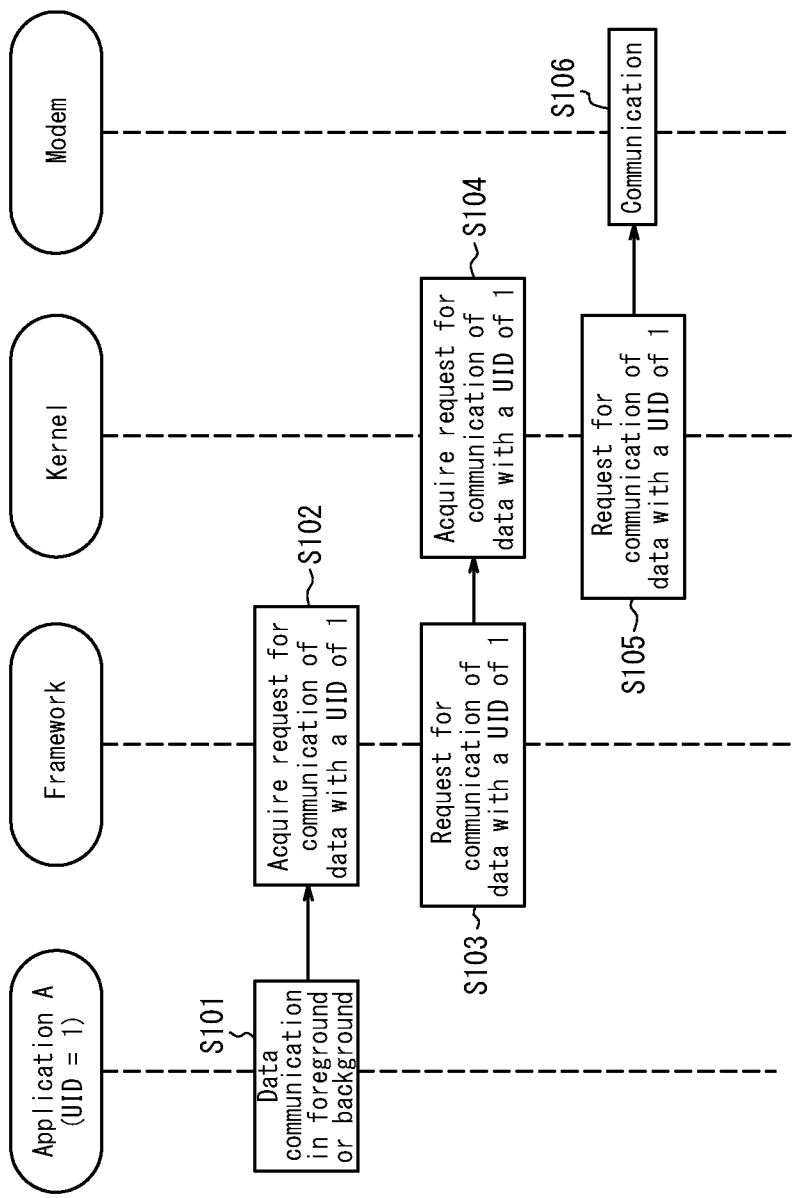
FIG. 5 illustrates an example of a sequence for transmitting data from an app.

In steps S7 to S9 of FIG. 4, the case of an app requesting data communication and the modem 112 performing data communication has been described. With reference to FIG. 5, the following describes this sequence in greater detail. FIG. 5 illustrates the sequence for the app A16*a*, framework, kernel, and modem 112. A description of the app A16*a*, framework, kernel, and modem 112 is the same as in FIG. 4 and is therefore omitted.

Whether running in the foreground or the background, the app A16*a* outputs a request, to the framework on the OS on which the app A16*a* is running, for data communication of data (data with a UID of 1) transmitted from the app A16*a* (request for communication of data with a UID of 1) (step S101).

The framework acquires the request for communication of data with a UID of 1 (step S102). Next, the framework outputs the request for communication of data with a UID of 1 to the kernel (step S103).

The kernel acquires the request for communication of data with a UID of 1 (step S104). Next, the kernel outputs data based on the request for communication of data with a UID of 1 to the modem 112 (step S105). The modem 112 then performs data communication to transmit the data with a UID of 1 to the network (step S106).

With the operations of the sequence illustrated in FIG. 5 as described above, data transmitted from the app are output to the communication interface 11 and are transmitted to the network.

Comparative Example

With the filtering according to the embodiment described thus far, in addition to the default condition to prohibit communication, a condition to permit communication is explicitly added by the user. Therefore, data communication not intended by the user is more likely to be prohibited. The following describes filtering according to a Comparative Example of this embodiment. The filtering conditions used in the filtering according to the Comparative Example include a condition to permit data communication for all data by default (default condition to permit communication). In addition to permitting data communication for all data in this way, a condition to prohibit data communication for data with a UID designated by the user (condition to prohibit communication) is further set.

Figure 6:
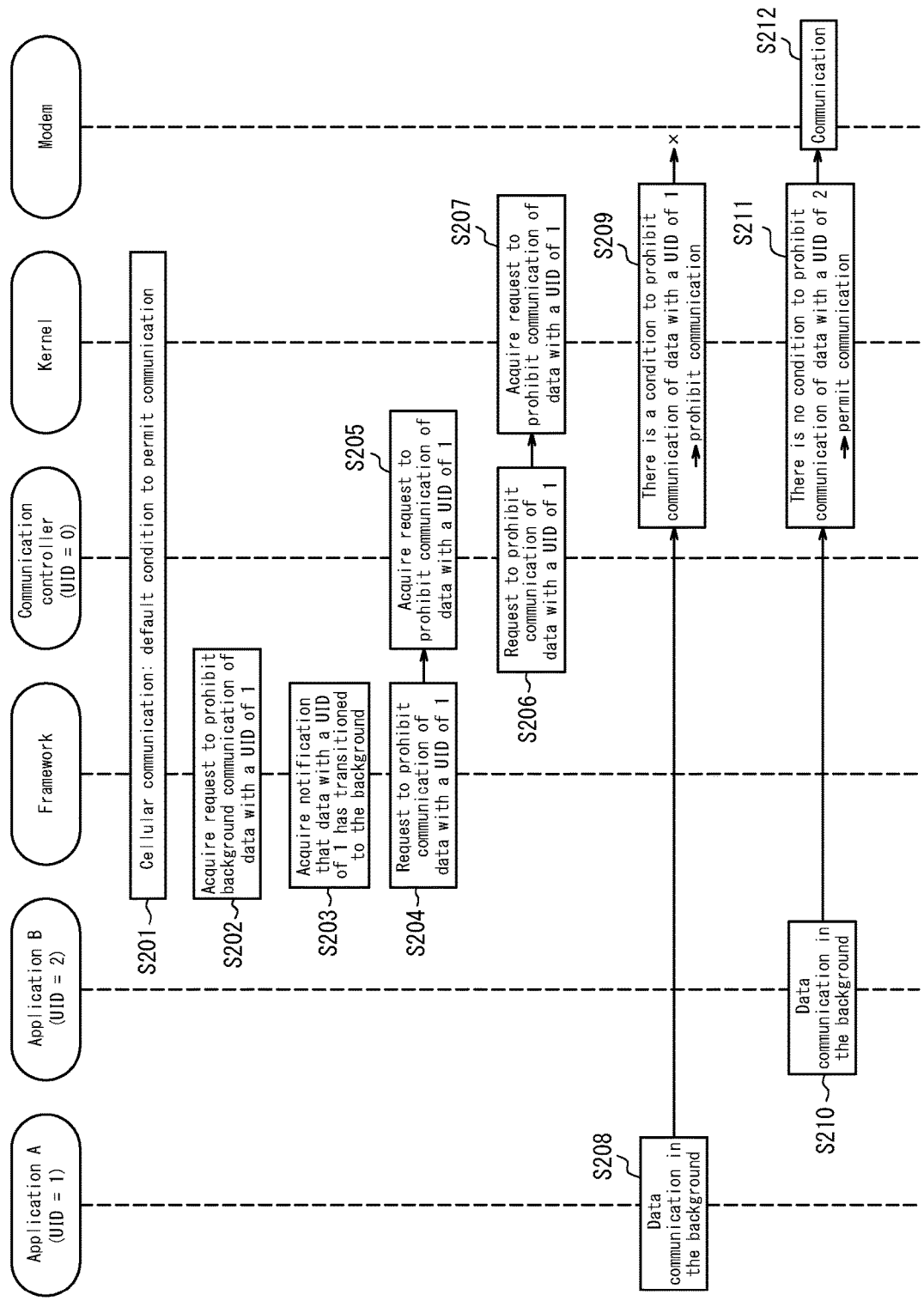
FIG. 6 illustrates the sequence of filtering according to a Comparative Example of Embodiment 1.

FIG. 6 illustrates the sequence of filtering according to a Comparative Example. A description of the app A16*a*, app B16*b*, framework, communication controller, kernel, and modem 112 is the same as in FIG. 4 and FIG. 5 and is therefore omitted.

In FIG. 6, even in the case of data transmission by an app running in the background, data communication by cellular communication is permitted by default (step S201). In other words, as a filtering condition, a default condition to permit communication is set for data transmitted from an app running in the background.

Next, the framework acquires a request to prohibit data communication for data with a UID of 1 in the case of the app A16*a* running in the background (request to prohibit communication of data with a UID of 1) (step S202). At this point in time, the app A16*a* is not running in the background, and therefore the condition to prohibit communication for data with a UID of 1 is not set.

Next, the framework acquires notification that the app A16*a* has transitioned to running in the background (background transition notification) (step S203). After receiving the notification, the framework outputs the request to prohibit communication of data with a UID of 1 to the communication controller (step S204).

The communication controller acquires the request to prohibit communication of data with a UID of 1 (step S205). Next, the communication controller outputs the request to prohibit communication of data with a UID of 1 to the kernel (step S206).

The kernel acquires the request to prohibit communication of data with a UID of 1 (step S207). With the above operations in steps S202 to S207, the request to prohibit communication of data with a UID of 1 is conveyed to the kernel. In other words, as a filtering condition, a condition to prohibit communication for data with a UID of 1 is set.

Next, when the app A16a issues a request for data communication while running in the background (step S208), the kernel prohibits the data communication, since the kernel recognizes that the condition to prohibit communication for data with a UID of 1 is set (step S209).

Conversely, when the app B16b allocated a UID of 2 requests data communication while running in the background (step S210), the kernel recognizes that a condition to prohibit communication for data with a UID of 2 is not set. Accordingly, based on the default condition to permit communication, the kernel permits data communication (step S211). The modem 112 then performs data communication to transmit the data with a UID of 2 to the network (step S212).

Filtering according to a Comparative Example has been described above. In the Comparative Example, the default condition to permit communication is set. Therefore, data communication is permitted for background operation of the app B16b, for which the user has not explicitly set an additional filtering condition. Accordingly, when the user is not aware of the operations of the app B16b, data communication not intended by the user may be performed.

Conversely, in this embodiment, the default condition to prohibit communication is set as a filtering condition. On top of this default condition, a condition to permit communication for data with a UID designated by the user is further set. In this case, by prohibiting data communication for all data by default, data communication not intended by the user is more likely to be prohibited.

Filtering according to this embodiment and a Comparative Example has been described above. In the filtering according to this embodiment, data communication is prohibited for all data by default, unlike the filtering according to the Comparative Example. A condition to permit communication for data with a UID designated by the user is then explicitly set by the user as a filtering condition, thereby allowing data communication intended by the user.

With the filtering according to this embodiment having the above-described configuration, data communication for data transmitted from the app B16b, for which a filtering condition has not been explicitly set by the user, can be prohibited. In other words, the probability of prohibiting data communication not intended by the user increases.

In this embodiment, a method for prohibiting data communication via a cellular communication method using the modem 112 as the I/F device 111 has mainly been described. The I/F device 111 is not limited to the modem 112, however, and may be the wireless LAN device 113 or the like. In other words, the control method for data communication of the communication apparatus 1 according to this embodiment is not limited to data communication with a cellular communication method and may also be applied to data communication with another communication method, such as a wireless LAN communication method.

In this embodiment, data communication may be permitted by default for functions that are necessary to transmit the data for which data communication is permitted. The functions for which data communication is permitted by default may, for example, be a tunneling function of a Virtual Private Network (VPN), a name resolving function of a Domain Name System (DNS), or a tethering function. Permission for data communication related to these functions may be restricted to operations intended by the user. The condition for permitting data communication for these functions may be set as a filtering condition that takes priority over the default condition to prohibit communication.

The filtering according to this embodiment is performed for data communication of an app running in the background, but filtering is not limited to this case and may be performed for data communication of an app running in the foreground. In other words, the filtering according to this embodiment may determine whether to permit or prohibit data communication for data transmitted by an app running in the foreground.

Embodiment 2

The following describes a communication apparatus according to Embodiment 2. In Embodiment 1, a configuration to control data communication based on the ID of an app and on filtering conditions was described. The communication apparatus according to Embodiment 2 differs from Embodiment 1 by temporarily permitting data communication of an app for which data communication is prohibited in both the foreground and the background and controlling data communication in accordance with an interrupt for the app.

As in Embodiment 1, the communication apparatus 1 according to Embodiment 2 includes the controller 10, communication interface 11, memory 12, display 13, and operation interface 14 (see FIG. 1). In the following description, where the structure is the same as in Embodiment 1, the same reference signs are applied, and a description thereof is omitted.

(Temporary Permission for Data Communication)

First, a configuration for the communication apparatus 1 to permit data communication of an app temporarily is described.

Figure 7:
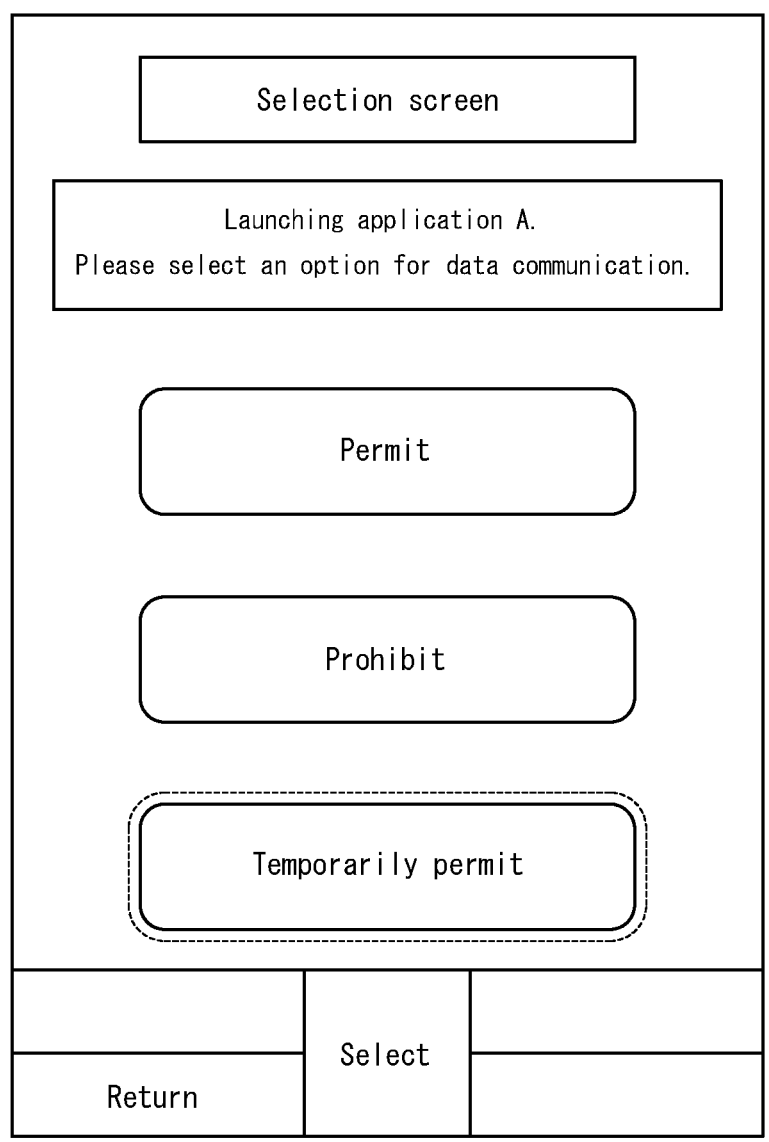
FIG. 7 illustrates an example of a selection screen according to Embodiment 2.

First, when the controller 10 launches an app (for example, with UID=1) for which data communication is prohibited in both the foreground and the background, the controller 10 displays a predetermined selection screen on the display 13. On the selection screen, for example as illustrated in FIG. 7, a plurality of options ("permit", "prohibit", and "temporarily permit") related to data communication of the app (UID=1) are displayed. The controller 10 makes a setting related to data communication of the app (UID=1) in accordance with the option selected by a user operation on the operation interface 14.

For example, when the "permit" option is selected, the controller 10 newly sets a filtering condition to permit data communication for UID=1. When the "prohibit" option is selected, the controller 10 maintains the filtering condition to prohibit data communication for UID=1 in both the foreground and the background.

The "temporarily permit" option receives a user operation for temporarily permitting data communication of the app (UID=1). When the "temporarily permit" option is selected, the controller 10 temporarily permits data communication for UID=1. For the app (UID=1) for which data communication is temporarily permitted, data communication is permitted only from when the app (UID=1) is launched (for example, executed in the foreground) until the app (UID=1) transitions to the background. The following describes the case of the "temporarily permitted" option having been selected.

When the app (UID=1) for which data communication is temporarily permitted transitions from the foreground to the background, the controller 10 eliminates the temporary permission for data communication (i.e. prohibits data communication) by the app (UID=1).

(Data Communication Control in Response to an Interrupt)

Next, the following describes the configuration for the communication apparatus 1 to control data communication in response to an interrupt for the app (UID=1) for which data communication is temporarily permitted.

First, when an interrupt is generated by another app (UID=n) in response to some sort of event, the controller 10 transitions the app (UID=1) currently in the foreground from the foreground to the background and executes the other app (UID=n) in the foreground.

Here, interrupts from the other app (UID=n) include an interrupt not intended by the user (first interrupt) and an interrupt other than an interrupt not intended by the user (second interrupt).

The first interrupt not intended by the user may include an interrupt by any event generated not by user operation but rather automatically, for example including an interrupt from a phone app due to an incoming voice call event, an interrupt from an alarm app due to an alarm event generated at a predetermined time, an interrupt from a screen lock app due to a screen lock event generated in response to the elapse of time, and the like.

On the other hand, the second interrupt other than an interrupt not intended by the user may include an interrupt from any event generated in response to user operation, for example including an interrupt from a home app due to an app transition event generated in response to user operation on a physical key (for example, home button).

For example, the memory 12 stores the UID of an app corresponding to the first interrupt (first UID), and when an interrupt from another app is generated, the controller 10 judges that this interrupt is the first interrupt if the UID of the other app matches the first UID and judges that this interrupt is the second interrupt if the UID does not match the first UID. Alternatively, the memory 12 may store the UID of an app corresponding to the second interrupt (second UID), and when an interrupt from another app is generated, the controller 10 may judge that this interrupt is the second interrupt if the UID of the other app matches the second UID and judge that this interrupt is the first interrupt if the UID does not match the second UID.

Next, when the app (UID=1) for which data communication is temporarily permitted transitions from the foreground to the background, the controller 10 controls data communication of the app (UID=1) in accordance with whether the app (UID=1) transitioned to the background due to the first interrupt or the second interrupt.

In greater detail, when the app (UID=1) transitions to the background due to the first interrupt, which is not intended by the user, then the controller 10 maintains the temporary permission for data communication by the app (UID=1) without eliminating the temporary permission. Accordingly, after the app (UID=1) transitions from the foreground to the background due to an interrupt, for example from a phone app (for example, UID=2) upon an incoming call event, the app (UID=1) can still perform data communication. Subsequently, the app (UID=1) can similarly still perform data communication after transitioning from the background to the foreground due to termination of the phone app (UID=2) running in the foreground.

On the other hand, when the app (UID=1) transitions to the background due to the second interrupt other than the first interrupt, then the controller 10 eliminates the temporary permission for data communication by the app (UID=1). In other words, the controller 10 prohibits data communication by the app (UID=1). Accordingly, upon the app (UID=1) transitioning from the foreground to the background as a result of an interrupt for example from the home app (for example, UID=3) due to an app transition event generated in response to user operation, data communication is prohibited. Subsequently, even if the app (UID=1) transitions from the background to the foreground due to termination of the home app (UID=3) running in the foreground, data communication is still prohibited for the app (UID=1).

With this configuration, when launching any app, the user of the communication apparatus 1 can select the "temporarily permit" option displayed to be selectable on the selection screen. With the "temporarily permit" option, data communication of the app is temporarily permitted until the app transitions from the foreground to the background. Accordingly, when the app transitions from the foreground to the background, the temporary permission for data communication of the app is eliminated (i.e., data communication is prohibited). Therefore, the occurrence of communication not intended by the user is reduced.

Also, when the app for which data communication is temporarily permitted transitions from the foreground to the background due to an interrupt not intended by the user, the temporary permission for data communication of the app is not eliminated but rather maintained. According to this configuration, an app for which data communication is temporarily permitted can perform data communication on an exceptional basis when transitioning from the foreground to the background without intent by the user, thereby increasing the user-friendliness of the communication apparatus 1.

Figure 8:
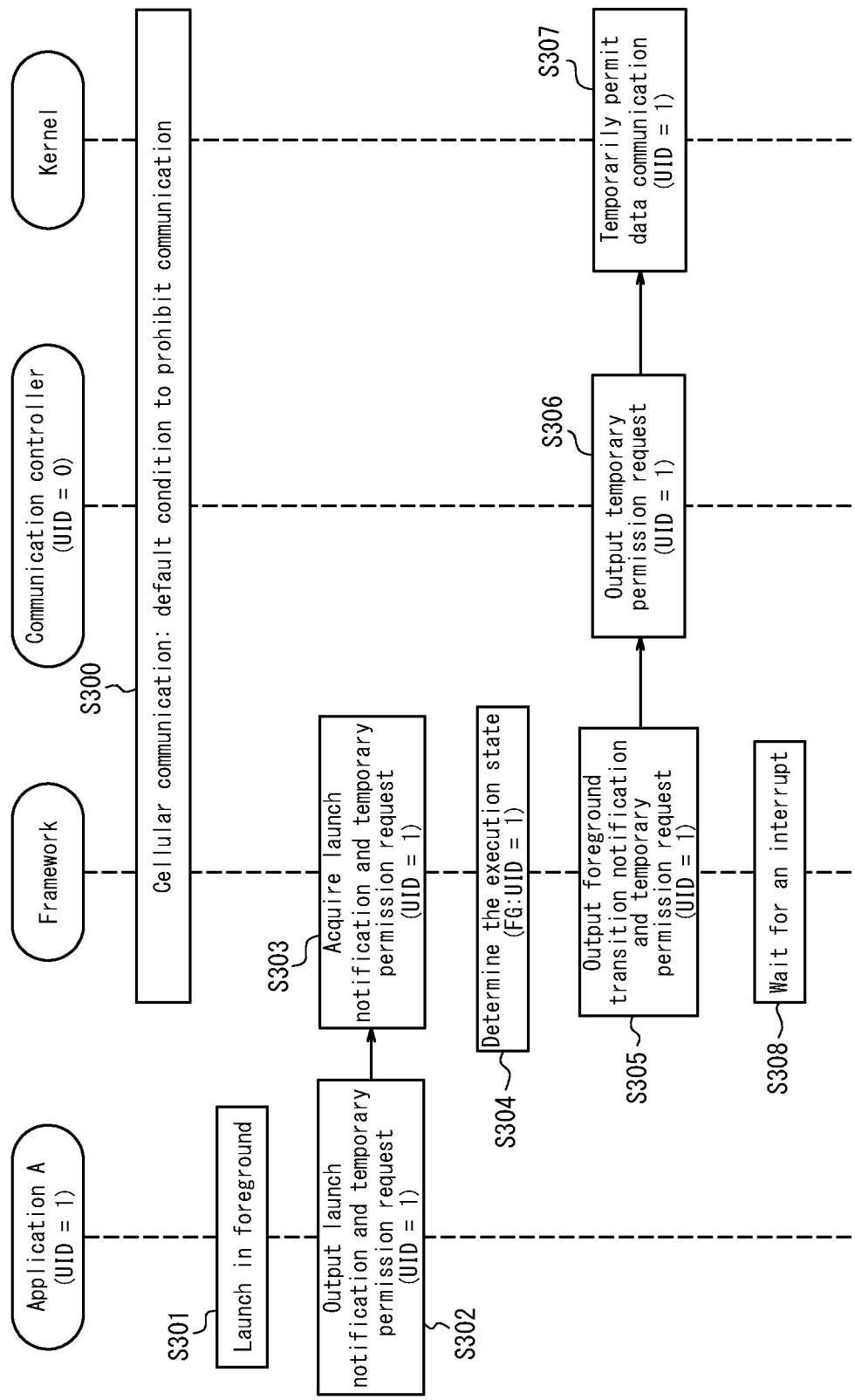
FIG. 8 illustrates the sequence of processing to permit data communication temporarily according to Embodiment 2.
Figure 9:
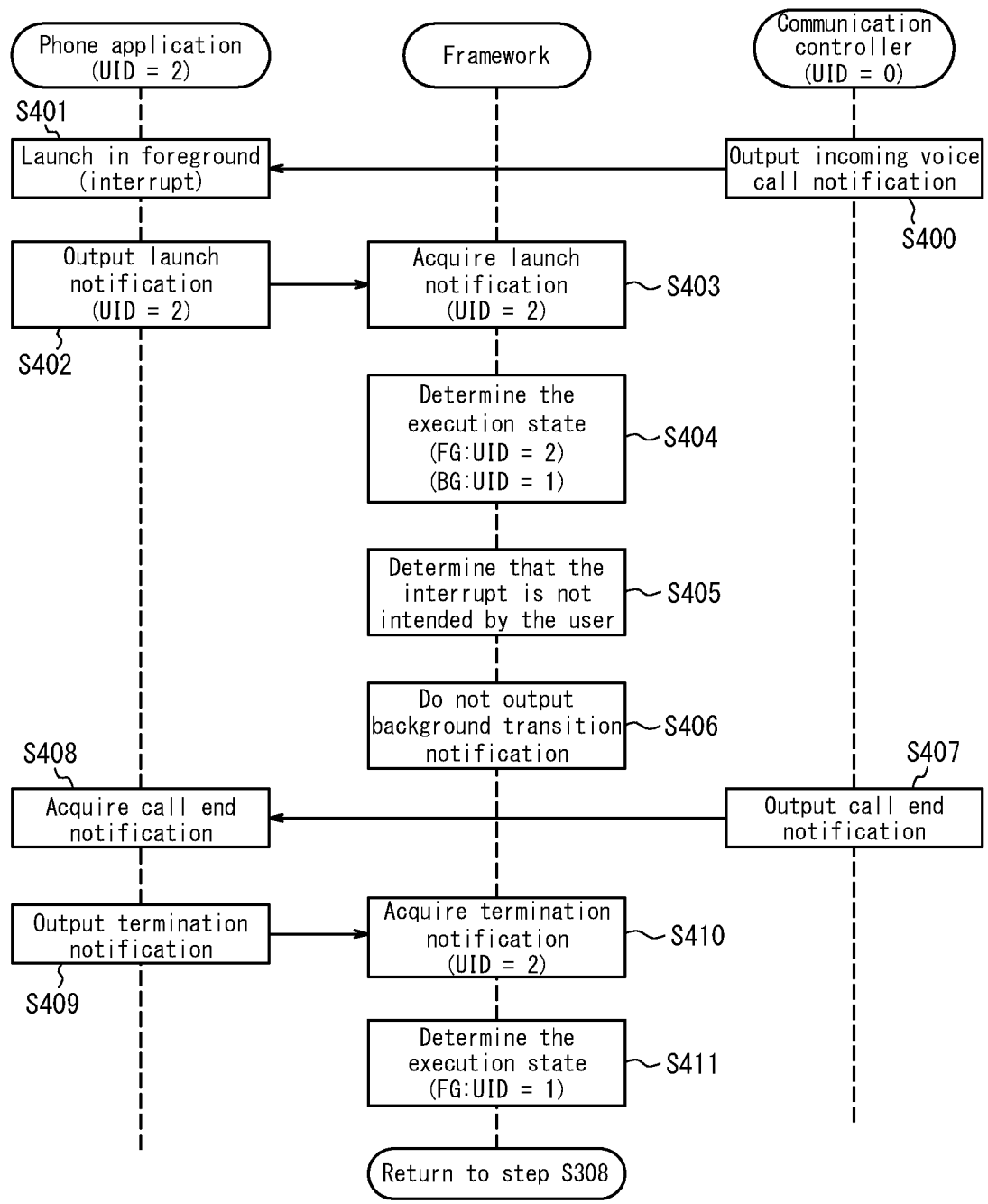
FIG. 9 illustrates the sequence of processing in response to a first interrupt according to Embodiment 2.

Next, with reference to FIGS. 8 to 10, the above-described operations of the controller 10 in the communication apparatus 1 are described in detail. For the sake of clarity, the subject executing the operations of the controller 10 is indicated as an app or a functional element of the OS as necessary.

First, with reference to FIG. 8, operations to permit data communication of an app A (UID=1) temporarily are described. Here, all data communication is assumed to be performed by cellular communication, and the default condition to prohibit communication during cellular communication is assumed to be set (step S300).

First, the controller 10 launches the app A (UID=1) in the foreground (step S301).

Next, the app A outputs, to the framework, a launch notification (UID=1) indicating launch of the app A and a temporary permission request (UID=1) to request temporary permission for data communication of the app A (step S302). The temporary permission request is output when, for example, the "temporary permission" option is selected on the selection screen.

Next, the framework acquires the launch notification and the temporary permission request from the app A (step S303). Based on the launch notification, the framework (for example, activity manager) then determines the execution state of apps (processes), specifically the app running in the foreground and the app(s) running in the background. Here, the framework determines that the app A (UID=1) is running in the foreground (step S304).

Next, the framework outputs, to the communication controller, a foreground transition notification (UID=1) indicating that the app A was launched in the foreground and a temporary permission request (UID=1) for data communication of the app A (step S305). The communication controller then outputs, to the kernel, the temporary permission request (UID=1) for data communication of the app A (step S306). Next, the kernel temporarily permits data communication of the app A (UID=1) (step S307).

The framework waits for an interrupt from another app (UID=n) (step S308).

Next, with reference to FIG. 9, the following describes operations by the controller 10 when the first interrupt, which is not intended by the user, occurs after the above-described step S308. Here, a phone app (UID=2) is provided as an example of the other app, and the memory 12 is assumed to store UID=2 as the first UID.

First, the communication controller outputs an incoming voice call notification indicating the occurrence of an incoming voice call (step S400). Next, the controller 10 launches the phone app (UID=2) in the foreground (step S401). Accordingly, an interrupt due to the phone app is generated.

Next, the phone app outputs a launch notification (UID=2) of the phone app to the framework (step S402). The framework (for example, activity manager) then acquires the launch notification (UID=2) (step S403).

Next, the framework (activity manager) determines the execution state of apps. Here, the framework determines that the phone app (UID=2) is running in the foreground, and the app A (UID=1) is running in the background (step S404).

Next, the framework determines whether the interrupt due to the app running in the foreground (i.e., the app that generated an interrupt in step S401) is the first interrupt not intended by the user or the second interrupt other than the first interrupt. Here, the interrupt is determined to be the first interrupt (step S405).

Next, since the interrupt was determined to be the first interrupt in step S405, the framework suspends output of the background transition notification indicating that the app A (UID=1) has transitioned to the background (step S406). In other words, the framework refrains from outputting the background transition notification to the communication controller.

The communication controller is configured to eliminate the temporary permission for data communication of the app A upon acquiring the background transition notification (UID=1) of the app A. Accordingly, since the background transition notification is not output to the communication controller here, the temporary permission for data communication of the app A is not eliminated but rather maintained.

Next, once the voice call ends, the communication controller outputs a call end notification indicating the end of the voice call to the phone app (step S407). The phone app then acquires the call end notification (step S408).

Next, the phone app outputs a termination notification indicating termination of the phone app to the framework (step S409), and the phone app terminates. The framework (activity manager) then acquires the termination notification (step S410).

Next, the framework (activity manager) determines the execution state of apps. Here, since the phone app has terminated, the framework determines that the app A (UID=1) is running in the foreground (step S411). The framework then returns to the above-described step S308 and waits for an interrupt from another app.

Next, with reference to FIG. 10, the following describes operations by the controller 10 when the second interrupt other than the first interrupt occurs after the above-described step S308. Here, a home app (UID=3) is provided as an example of the other app, and the memory 12 is assumed not to store UID=3 as the first UID.

First, the controller 10 launches the home app (UID=3) in the foreground in response to user operation, for example on a physical key (step S500). Accordingly, an interrupt due to the home app is generated.

Next, the home app outputs a launch notification (UID=3) of the home app to the framework (step S501). The framework (for example, activity manager) then acquires the launch notification (UID=3) (step S403).

Next, the framework (activity manager) determines the execution state of apps. Here, the framework determines that the home app (UID=3) is running in the foreground, and the app A (UID=1) is running in the background (step S503).

Next, the framework determines whether the interrupt due to the app running in the foreground (i.e., the app that generated an interrupt in step S500) is the first interrupt not intended by the user or the second interrupt other than the first interrupt. Here, the interrupt is determined to be the second interrupt (step S504).

Next, since the interrupt was determined to be the second interrupt in step S504, the framework outputs the background transition notification (UID=1), indicating that the app A has transitioned to the background, to the communication controller (step S505).

Next, the communication controller eliminates the temporary permission for data communication of the app A upon acquiring the background transition notification (UID=1) of the app A. In greater detail, the communication controller outputs, to the kernel, a prohibition request (UID=1) to prohibit data communication of the app A (step S506).

Upon acquiring the prohibition request (UID=1) for the app A, the kernel eliminates the temporary permission for data communication of the app A (UID=1) and prohibits data communication (step S507).

As described above, when an app for which data communication was temporarily permitted transitions to the background, the communication apparatus 1 according to Embodiment 2 prohibits data communication of the app if the app transitioned to the background as the result of a second interrupt other than a first interrupt not intended by the user. With this configuration, when the app transitions from the foreground to the background, the temporary permission for data communication of the app is eliminated (i.e., data communication is prohibited). Therefore, the occurrence of communication not intended by the user is reduced.

When an app transitions to the background as the result of the first interrupt not intended by the user, the communication apparatus 1 maintains temporary permission for data communication of the app. According to this configuration, an app for which data communication is temporarily permitted can perform data communication on an exceptional basis when transitioning from the foreground to the background without intent by the user, thereby increasing the user-friendliness of the communication apparatus 1.

Although exemplary embodiments have been described with reference to the accompanying drawings, it is to be noted that various changes and modifications will be apparent to those skilled in the art based on this disclosure. Therefore, such changes and modifications are to be understood as included within the scope of this disclosure. For example, the functions and the like included in the various components and steps may be reordered in any logically consistent way. Furthermore, components or steps may be combined into one or divided. While this disclosure has been described focusing on apparatuses, this disclosure may also be embodied as a method that includes steps performed by the components of an apparatus. Furthermore, while this disclosure has been described focusing on apparatuses, this disclosure may also be embodied as a method or program executed by a processor provided in an apparatus, or as a non-transitory computer-readable recording medium on which a program is recorded. Such embodiments are also to be understood as included in the scope of this disclosure.

For example, in the above-described embodiment, a configuration in which DNS processing is controlled based on the UID has been described, but control is not limited to the UID. A configuration may be adopted in which, for example, DNS processing is controlled based on the GID.

In Embodiment 2, a configuration has been described in which data communication by cellular communication of all apps (all UIDs and GIDs) is prohibited by default, regardless of whether an app is running in the foreground or running in the background. A configuration for prohibiting data communication of apps using UIDs or GIDs is not, however, limited to this example. For example, a configuration may be adopted in which data communication by cellular communication of all apps is permitted by default, with individual IDs for which data communication is prohibited by exception being additionally set. As another example, cellular communication by apps may be prohibited or permitted as described above only in the case of apps running in the foreground (or the background). In greater detail, cellular communication by all apps running in the background (or the foreground) may be prohibited (or permitted) by default.

In the above embodiments, wireless LAN has been provided as an example of a data communication method that is not a pay-as-you-go method, but this example is not limiting. Other data communication methods that are not pay-as-you-go methods include Bluetooth® and Ethernet® (Bluetooth and Ethernet are registered trademarks in Japan, other countries, or both).

The invention claimed is:

1. A communication apparatus capable of data communication, comprising:
a controller including at least one processor and at least one memory coupled to the at least one processor, the at least one processor configured to execute processes of:
temporarily permitting data communication of a first application only from when the first application is launched in the foreground to when the first application transitions to the background, wherein
when the first application transitions from the foreground to the background, the processor is configured to:
in a case that the first application transitions from the foreground to the background as a result of a second application launching in the foreground not in response to a user operation performed on the communication apparatus:
maintain temporary permission for data communication of the first application in the background; and
in a case that the first application returns to the foreground in response to termination of the second application, maintain temporary permission for data communication of the first application in the foreground; and
in a case that the first application transitions from the foreground to the background as a result of a second application launching in the foreground in response to a user operation performed on the communication apparatus:
prohibit data communication of the first application in the background; and in a case that the first application returns to the foreground in response to termination of the second application, prohibit data communication of the first application in the foreground, wherein
a kernel included in an OS of the communication apparatus temporarily permits data communication of the first application;
when the first application transitions to the background, a framework included in the OS
refrains from outputting a background transition notification to a communication controller included in the OS when the first application transitioned to the background as a result of the second application launching in the foreground not in response to a user operation performed on the communication apparatus; and
outputs the background transition notification to the communication controller when the first application transitioned to the background as a result of the second application launching in the foreground in response to a user operation performed on the communication apparatus;
the communication controller outputs, to the kernel, a prohibition request to prohibit data communication of the first application upon acquiring the background transition notification; and
the kernel prohibits data communication of the first application upon acquiring the prohibition request.

2. The communication apparatus of claim 1, wherein the second application launching in the foreground not in response to a user operation performed on the communication apparatus includes at least one of an interrupt due to an incoming call event, an interrupt due to an alarm event, and an interrupt due to a screen lock event.

3. The communication apparatus of claim 1, wherein the processor temporarily permits data communication of the first application upon receiving a user operation for temporarily permitting data communication of the first application when the first application is launched in response to a user operation.

4. The communication apparatus of claim 2, wherein the processor temporarily permits data communication of the first application upon receiving a user operation for temporarily permitting data communication of the first application when the first application is launched in response to a user operation.

5. A communication control method performed by a communication apparatus capable of data communication, the communication control method comprising:
temporarily permitting data communication of a first application only from when the first application is launched in the foreground to when the first application transitions to the background; and
when the first application transitions from the foreground to the background:
in a case that the first application transitions from the foreground to the background as a result of a second application launching in the foreground not in response to a user operation performed on the communication apparatus:
maintaining temporary permission for data communication of the first application in the background; and
in a case that the first application returns to the foreground in response to termination of the second application, maintaining temporary permission for data communication of the first application in the foreground; and in a case that the first application transitions from the foreground to the background as a result of a second application launching in the foreground in response to a user operation performed on the communication apparatus:

prohibiting data communication of the first application in the background; and in a case that the first application returns to the foreground in response to termination of the second application, prohibiting data communication of the first application in the foreground, wherein a kernel included in an OS of the communication apparatus temporarily permits data communication of the first application;

when the first application transitions to the background, a framework included in the OS refrains from outputting a background transition notification to a communication controller included in the OS when the first application transitioned to the background as a result of the second application launching in the foreground not in response to a user operation performed on the communication apparatus; and outputs the background transition notification to the communication controller when the first application transitioned to the background as a result of the second application launching in the foreground in response to a user operation performed on the communication apparatus;

the communication controller outputs, to the kernel, a prohibition request to prohibit data communication of the first application upon acquiring the background transition notification; and the kernel prohibits data communication of the first application upon acquiring the prohibition request.

6. A non-transitory computer-readable recording medium including computer program instructions, which when executed by a communication apparatus capable of data communication, cause the communication apparatus to:

temporarily permit data communication of a first application only from when the first application is launched in the foreground to when the first application transitions to the background; and when the first application transitions from the foreground to the background:

in a case that the first application transitions from the foreground to the background as a result of a second application launching in the foreground not in response to a user operation performed on the communication apparatus:

maintain temporary permission for data communication of the first application in the background; and in a case that the first application returns to the foreground in response to termination of the second application, maintain temporary permission for data communication of the first application in the foreground; and in a case that the first application transitions from the foreground to the background as a result of a second application launching in the foreground in response to a user operation performed on the communication apparatus:

prohibit data communication of the first application in the background; and in a case that the first application returns to the foreground in response to termination of the second application, prohibit data communication of the first application in the foreground, wherein a kernel included in an OS of the communication apparatus temporarily permits data communication of the first application;

when the first application transitions to the background, a framework included in the OS refrains from outputting a background transition notification to a communication controller included in the OS when the first application transitioned to the background as a result of the second application launching in the foreground not in response to a user operation performed on the communication apparatus; and outputs the background transition notification to the communication controller when the first application transitioned to the background as a result of the second application launching in the foreground in response to a user operation performed on the communication apparatus;

the communication controller outputs, to the kernel, a prohibition request to prohibit data communication of the first application upon acquiring the background transition notification; and the kernel prohibits data communication of the first application upon acquiring the prohibition request.

* * * * *